Nov. 3, 1925.

W. M. AUSTIN

DRAFT GEAR

Filed June 17, 1920

1,559,540

Deflection

WITNESSES:

INVENTOR
Walter M. Austin
BY
ATTORNEY

Patented Nov. 3, 1925.

1,559,540

UNITED STATES PATENT OFFICE.

WALTER M. AUSTIN, OF SWISSVALE, PENNSYLVANIA.

DRAFT GEAR.

Application filed June 17, 1920. Serial No. 389,605.

*To all whom it may concern:*

Be it known that I, WALTER M. AUSTIN, a citizen of the United States, and a resident of Swissvale, in the county of Allegheny and State of Pennsylvania, have invented a new and useful Improvement in Draft Gears, of which the following is a specification.

My invention relates to draft rigging and particularly to frictional draft rigging.

One object of my invention is to provide a friction draft rigging that shall have a maximum friction surface.

Another object of my invention is to pro a draft rigging having resilient friction members.

Another object of my invention is to provide a draft rigging having means whereby the rise in resistance near mid stroke shall be limited.

Another object of my invention is to provide a draft rigging, of the above indicated character, that shall have means for assisting in the release of the device when pressure is removed.

A further object of my invention is to provide a rigging, of the above indicated character, that shall be simple and inexpensive to construct and efficient in its operation.

In practicing my invention, I provide a housing having a tapered opening therein in which are disposed two resilient oppositely-disposed tapered frictional members having double helical engaging surface. A yoke member is disposed within the frictional members and has a flange thereon that engages the inner ends of the inner frictional member. A spring is disposed between the yoke member and one end of the housing. Since the resilient frictional members are split longitudinally and, since their engaging surfaces are helical, when they are forced together, they expand to frictionally engage the surface of the opening in the housing. With this arrangement, the pressure resisting relative movement between the housing and the frictional members may be adjusted to any desired value for various deflections.

Figure 1:
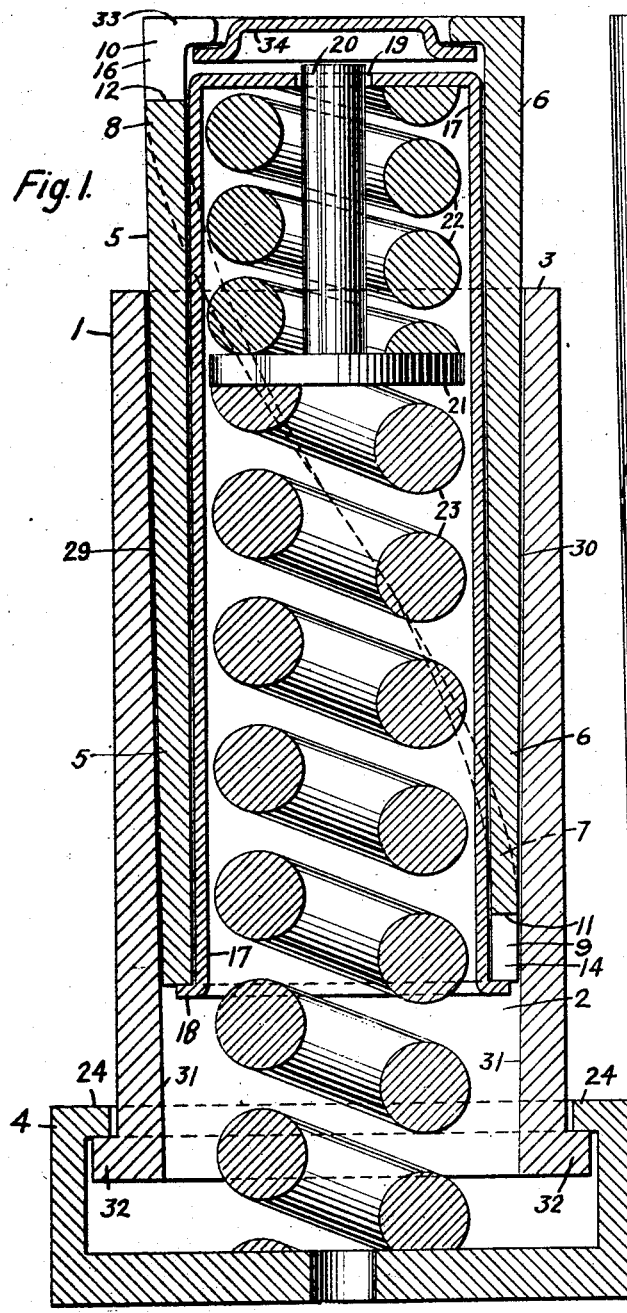
Figure 2:
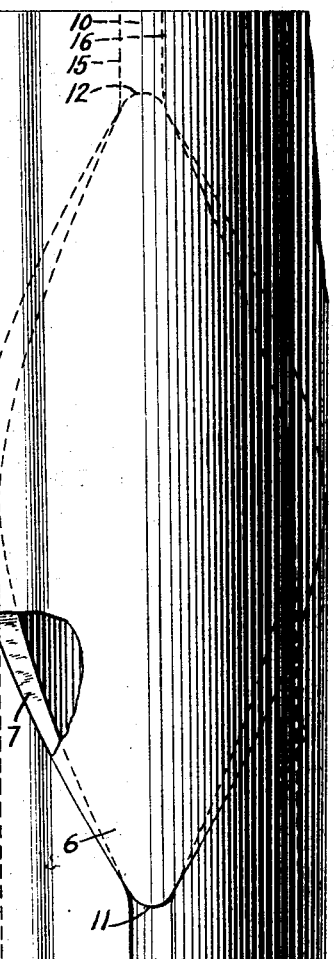
Figure 3:
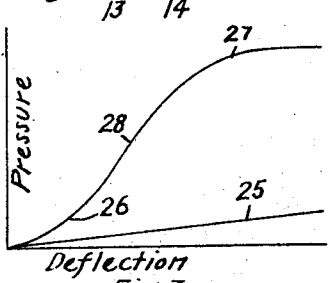

In the accompanying drawings, Figure 1 is a sectional view of a draft rigging embodying my invention; Fig. 2 is an elevational view, with parts broken away, of the frictional members shown in Fig. 1, and Fig. 3 is a diagram illustrating the operation of the device shown in Fig. 1.

A housing 1 is provided with an opening 2 the walls of which taper from the outer end 3 thereof to the inner end. Two resilient frictional members 5 and 6 severally have two helical engaging surfaces 7 and 8 which engage throughout under all conditions. The members 5 and 6 are split and separated at points 9 and 10 and are slightly tapered to conform to the taper of the opening in the housing 1. The apex of the member 6 is normally disposed adjacent the point 9 and the apex 12 of the member 5 is disposed adjacent the point 10. Since the helical surfaces 7 and 8 are formed in opposite directions from the apex 11 and also from the apex 12 it will be readily seen that when the members 5 and 6 are moved toward each other longitudinally the surfaces 7 and 8 will remain in engagement and the divided portions 13 and 14 of the member 5 will separate as will also the divided portions 15 and 16 of the member 6.

A cylindrical yoke 17 is disposed within the members 5 and 6 and has a flange 18 at its inner side upon which the member 5 rests. The yoke 17 is provided with an opening 19 at its outer end through which extends the stem 20 of a floating member 21. A relatively light spring 22 is disposed between the floating member 21 and the outer end of the yoke 17 and a relatively stiff spring 23 is disposed between a relatively-movable end cap 4 of the housing 1 and the inner side of the floating member 21. The cap 4 is provided with an inwardly extending flange 24 that engages an outwardly extending flange 32 on the housing 1. However, the inner end of the housing 1 may be closed and the spring 23 disposed between the member 21 and the inner end of the housing.

The outer friction member 6 is provided with an inwardly extending flange 33. A plate member 34 is adapted to be engaged by the member 20 when the rigging is released and the plate 34 in turn engages the flange 33 to assist in the releasing of the outer friction member from the housing.

If no frictional means were employed, the springs would offer a pressure in opposition to their deflection substantially as shown in the straight line 25 in Fig. 3 of the drawings. However, it is desirable to greatly increase the retarding pressure shortly after the retarding force is applied. That is, when it is desired to stop a train, it is first desired to absorb energy as shown at point 26 of the curve 27 and then to greatly increase the pressure of retardation as is shown at the portion 28. This may be accomplished with my invention.

When pressure is applied between the outer end of the friction member 6 and the cap 4 the springs 22 and 23 are compressed until the cap 4 engages the inner end of the housing. The two helical surfaces 7 and 8 of the outer frictional member 6 are forced against the corresponding surfaces 7 and 8 of the inner frictional member 5. The member 5 is pressed against the flange 18 of the yoke 17 and this pressure is transmitted to the springs. The initial action is almost entirely spring action, the only friction being between the helical surfaces 7 and 8. Further inward movement causes the inner friction member 5 to expand against the inside of the housing by the wedging action between the surfaces 7 and 8 of the members 5 and 6 and the reaction of the springs 22 and 23. At this point, shown on curve 27 in Fig. 3 of the drawings, the pressure increases rapidly for small increases in deflection until the smaller spring 22 has shortened to such an extent that any further deflection presses directly on the larger spring 23 after which only relatively slight increases in reactions of the gear will be had during the remainder of the stroke.

When both the members 5 and 6 have been expanded until their outer surfaces 29 and 30, respectively, touch the bore 31 of the housing 1, any further inward movement of the member 6 will begin to decrease the circumference of both members 5 and 6 thereby causing the inner friction member 5 to move inwardly at a slightly greater rate than the outer member 6 does. The result of this is to still more tightly press the friction members outwardly against the housing by reason of the frictional reaction parallel to the helical surfaces.

When the load on the draft gear is reduced to a value less than the difference between the loads on the two springs 22 and 23, the larger spring 23 will expand further compressing the small spring 22 and the member 20 will press against the plate 34 and the plate 34 will press outwardly against the flange 33 on the member 6 to assist in withdrawing it from the wedged position in engagement with the inner friction member 5.

As soon as the outer friction member 6 begins to withdraw from its innermost position in the housing 1, the inner member 5 will be forced outwardly by the springs 22 and 23 thus maintaining contact with the outer friction member 6 until the springs have reached their full length.

It will be understood that my invention is not limited to two springs, the relatively movable end cap 4 for the housing or to other features such as the plate 34 as it will operate satisfactorily with one spring, a closed inner end for the housing and without the plate 34. I have found that the device may be adapted to obtain any desired characteristics. I, therefore, do not limit my invention to the specific structures illustrated as it may be variously modified without departing from the spirit and scope of the invention, as set forth in the appended claims.

I claim as my invention:

1. A draft gear comprising a housing having a tapered interior bore, two oppositely disposed resilient friction members the engaging surfaces of which have a large pitch and a resilient member disposed between one end of the housing and the corresponding end of one of the resilient friction members.

2. A draft gear comprising a housing having a tapered interior bore, two oppositely disposed resilient friction members having engaging surfaces that cooperate when the members are moved inwardly in the housing to cause the members to expand whereby the outer surfaces thereof frictionally engage the inner surfaces of the housing, and resilient means for restoring the friction members to their initial positions.

3. A draft gear comprising a housing having a slightly tapered opening therein, two oppositely disposed resilient friction members having engaging surfaces of relatively large pitch, and a spring disposed within the resilient friction members between one end of one and the housing.

4. A draft gear comprising a housing having a slightly tapered opening therein, two oppositely disposed friction members having engaging surfaces of relatively large pitch, a yoke member disposed within the friction members and operatively connected to one thereof, and a spring disposed within the yoke member and between the same and the housing.

5. A draft gear comprising a housing having an opening therein, two oppositely disposed resilient friction members having engaging surfaces of relatively large pitch and a spring disposed between one end of the housing and the corresponding end of one of the resilient friction members.

6. A draft gear comprising a housing having a slightly tapered opening therein, two oppositely disposed flexible friction members having engaging surfaces of relatively large pitch, a yoke member disposed within the flexible friction members and engaging one end of one of the friction members, and a spring resistance within the yoke member between one end thereof and the housing.

7. A draft gear comprising a housing having a slightly tapered opening therein, two oppositely disposed flexible friction members having engaging surfaces of relatively large pitch, a yoke member disposed within the flexible friction members and engaging one end of one of the friction members, and resilient means disposed within the yoke member between one end thereof and the housing.

8. A draft gear comprising a housing having a slightly tapered opening therein, two oppositely disposed resilient friction members having engaging surfaces of relatively large pitch, a yoke member disposed within the friction members and engaging one end of one of the friction members, and resilient means disposed within the yoke member between one end thereof and the housing.

9. A draft rigging comprising a housing having an inner frictional surface, constantly engaged frictional members cooperating therewith, said frictional members being resilient and having engaging surfaces of relatively large pitch whereby lateral movement thereof expands the same to cause the outer surface thereof to frictional engage the inner frictional surface of the housing, and means for releasing the frictional members from engagement with the housing.

10. A draft rigging comprising a housing having an opening therein, two resilient frictional members disposed in the opening and having helical co-operating edges, a spring and means for connecting the spring between the housing and one end of one of the resilient frictional members.

11. A draft rigging comprising a housing, and two resilient frictional members having helical edges that cooperate to expand the frictional members into frictional engagement with the housing when they are moved into the housing and means for restoring the frictional members to their initial positions.

12. A draft rigging comprising a housing, and two resilient frictional members having helical edges that co-operate to expand the frictional members into frictional engagement with the housing when they are moved into the housing and resilient means for resisting the inward movement of the frictional members.

13. A draft rigging comprising a housing, and two resilient frictional members having helical edges that co-operate to expand the frictional members into frictional engagement with the housing when they are moved into the housing, and a spring for resisting the inward movement of the frictional members.

14. A draft rigging comprising a main housing having a tapered opening therein, two oppositely disposed tapered frictional members having double helical co-operating edges, a cylindrical yoke member having a flanged inner end engaging the inner end of one of the frictional members, and a spring between the inner end of the opening in the housing and the outer end of the yoke member.

15. A draft rigging comprising a main housing having a tapered opening therein, two oppositely disposed tapered frictional members having double helical co-operating edges, a cylindrical yoke member having a flanged inner end engaging the inner end of one of the frictional members, a floating member within the yoke, and a spring disposed on each side of the floating member between the yoke and the housing.

16. A draft rigging comprising a main housing, and two oppositely disposed resilient tapered frictional members having helical engaging surfaces that remain in engagement under all conditions, said resilient frictional members being adapted to expand into frictional engagement with the housing.

17. A draft rigging comprising a main housing and two constantly engaging resilient frictional members having means whereby they expand into frictional engagement with the housing when they are forced therein and means for opposing the movement inwardly of the frictional members.

18. A draft rigging comprising a main housing having a tapered opening therein, two oppositely disposed tapered frictional members having double helical co-operating edges, a cylindrical yoke member having a flanged inner end engaging the inner end of one of the frictional members, a floating member within the yoke, a spring disposed on each side of the floating member, and means whereby the floating member assists in the release of the frictional members when the springs expand.

19. A draft rigging comprising a main housing having a slightly tapered bore, two oppositely disposed resilient tapered frictional members having constantly engaged surfaces whereby the resilient members expand into frictional engagement with the tapered bore of the housing when they are forced therein, and means for restoring the frictional members to their initial positions.

20. A draft rigging comprising a housing having a tapered bore, two resilient frictional members having helical edges that co-operate to expand the resilient members into frictional engagement with the bore of the housing when they are moved into the housing, and means for restoring the frictional members to their initial positions.

21. A draft rigging comprising a housing having a frictional surface, constantly engaged resilient frictional members to co-operate therewith, said frictional members being of substantially split cylinders having their engaging surfaces of such pitch that lateral movement thereof expands the same to effect frictional engagement with the frictional surface of the housing, and means for restoring the frictional members to their initial positions.

22. A draft rigging comprising a housing having a frictional surface, constantly engaged resilient frictional members to co-operate therewith, the frictional members having engaging surfaces of such pitch that lateral movement thereof expands the same to effect frictional engagement with the frictional surface of the housing, and resilient means for restoring the frictional members to their initial positions.

23. A draft rigging comprising a housing having a frictional surface, two oppositely disposed tapered frictional members co-operating therewith, a floating member within the frictional members, a spring disposed on each side of the floating member, said floating member being adapted to permit one of the springs to be compressed a predetermined amount only and to transmit any further forces directly to the other spring.

24. A draft rigging comprising a housing having a frictional surface, two oppositely disposed tapered frictional members co-operating therewith, a floating member within the frictional members, a spring disposed on each side of the floating member, said floating member being adapted to permit one of the springs to be compressed a predetermined amount which is less than the amount that spring is ordinarily capable of being compressed.

In testimony whereof, I have hereunto subscribed my name this 4th day of June, 1920.

WALTER M. AUSTIN.